(12) United States Patent
Walker et al.

(10) Patent No.: US 9,417,407 B2
(45) Date of Patent: Aug. 16, 2016

(54) SEPARABLE LOCKING FIBER OPTIC CONNECTOR

(71) Applicant: COTSWORKS, LLC, Highland Heights, OH (US)

(72) Inventors: Andrew C. Walker, Willoughby, OH (US); Solomon S. Alkhasov, Cleveland Heights, OH (US); Matthew M. Krutsch, Cleveland Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 24 days.

(21) Appl. No.: 14/158,434

(22) Filed: Jan. 17, 2014

(65) Prior Publication Data

US 2014/0334778 A1  Nov. 13, 2014

Related U.S. Application Data

(60) Provisional application No. 61/821,529, filed on May 9, 2013.

(51) Int. Cl.
*G02B 6/38* (2006.01)
*G02B 6/42* (2006.01)

(52) U.S. Cl.
CPC .............. *G02B 6/389* (2013.01); *G02B 6/3825* (2013.01); *G02B 6/3893* (2013.01); *G02B 6/4292* (2013.01)

(58) Field of Classification Search
None
See application file for complete search history.

(56) References Cited

U.S. PATENT DOCUMENTS

| | | | |
|---|---|---|---|
| 5,151,961 | A | 9/1992 | Hvezda et al. |
| 5,481,634 | A | 1/1996 | Anderson et al. |
| 7,189,008 | B2 | 3/2007 | Dye |
| 7,621,675 | B1 | 11/2009 | Bradley |
| 2005/0265667 | A1 | 12/2005 | Auld |
| 2007/0297725 | A1 | 12/2007 | Wouters |
| 2010/0008630 | A1 | 1/2010 | Marrapode et al. |

FOREIGN PATENT DOCUMENTS

| | | |
|---|---|---|
| EP | 0928978 | 7/1999 |
| JP | 2006184491 | 7/2006 |
| JP | 2006195355 | 7/2006 |
| WO | 2006069092 | 6/2006 |

OTHER PUBLICATIONS

Invitation to Pay Additional Fees and, Where Applicable, Protest Fee from counterpart International Application No. PCT/US2014/012961, mailed Apr. 10, 2014.

*Primary Examiner* — Jerry Rahll
(74) *Attorney, Agent, or Firm* — Tucker Ellis LLP

(57) ABSTRACT

A fiber optic connector includes a housing and a locking member. The housing has a longitudinal passage extending between a first opening at a first end of the housing and a second opening at a second end of the housing, the housing sized to fit within a fiber optic receptacle. The locking member is a separate part from the housing and is sized to fit within a retaining notch in the fiber optic receptacle. The locking member, when secured to the housing and located in the retaining notch, interfaces with the retaining notch to prevent separation of the housing from the receptacle.

32 Claims, 7 Drawing Sheets

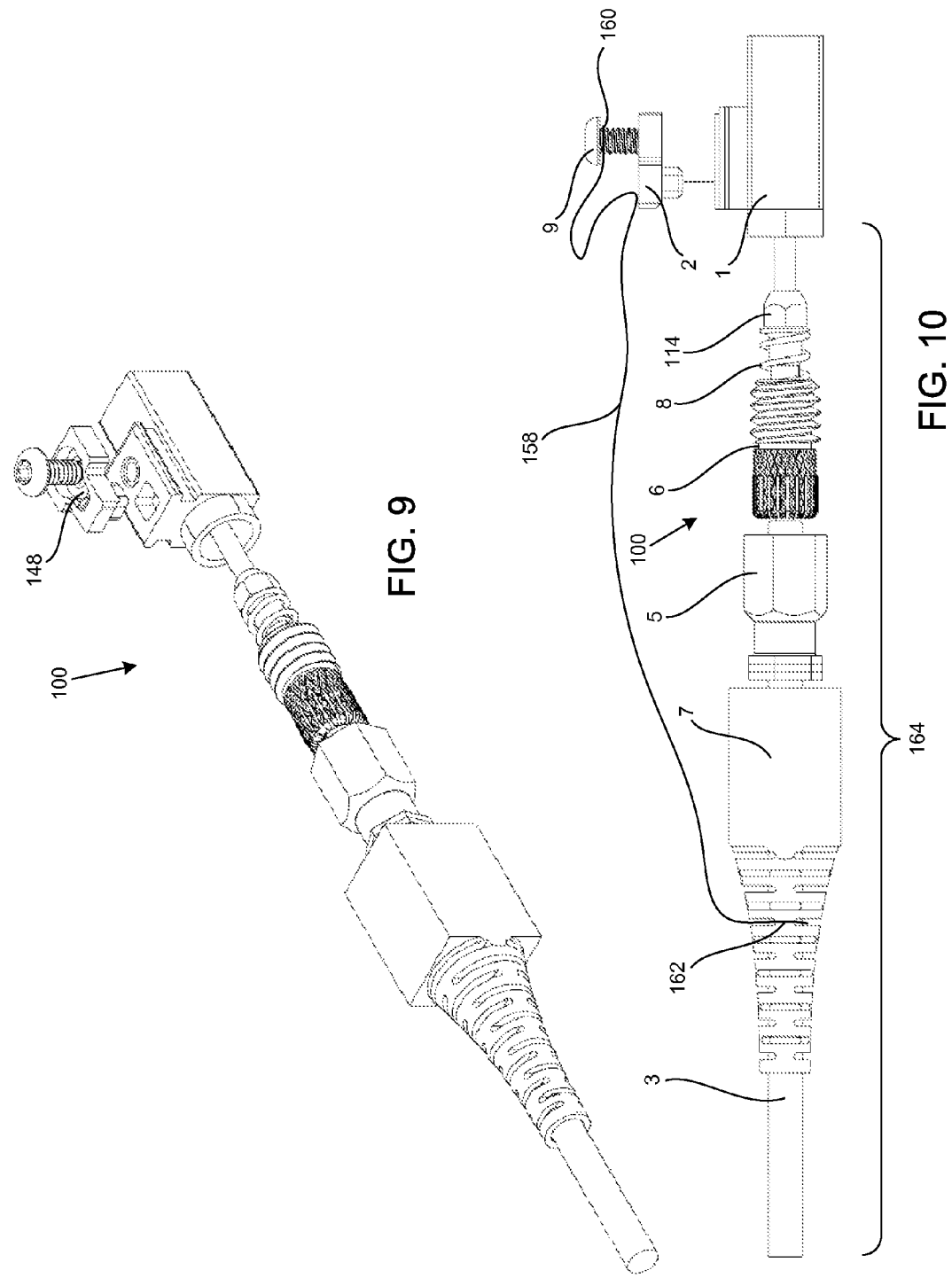

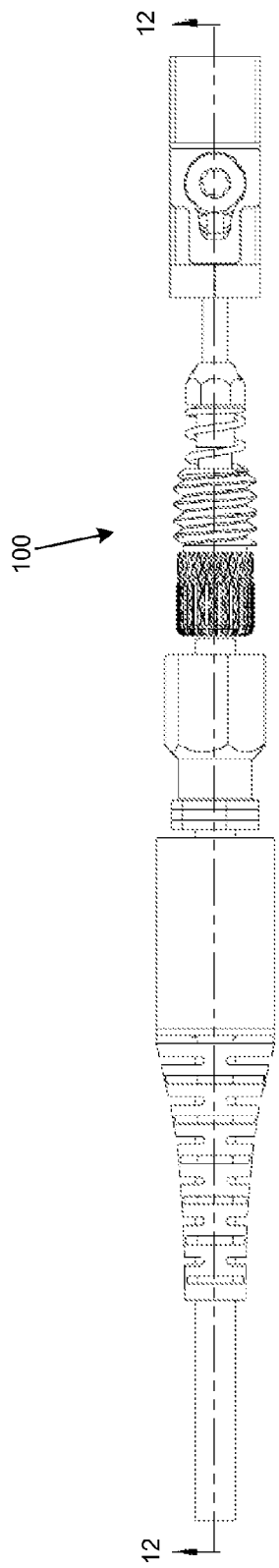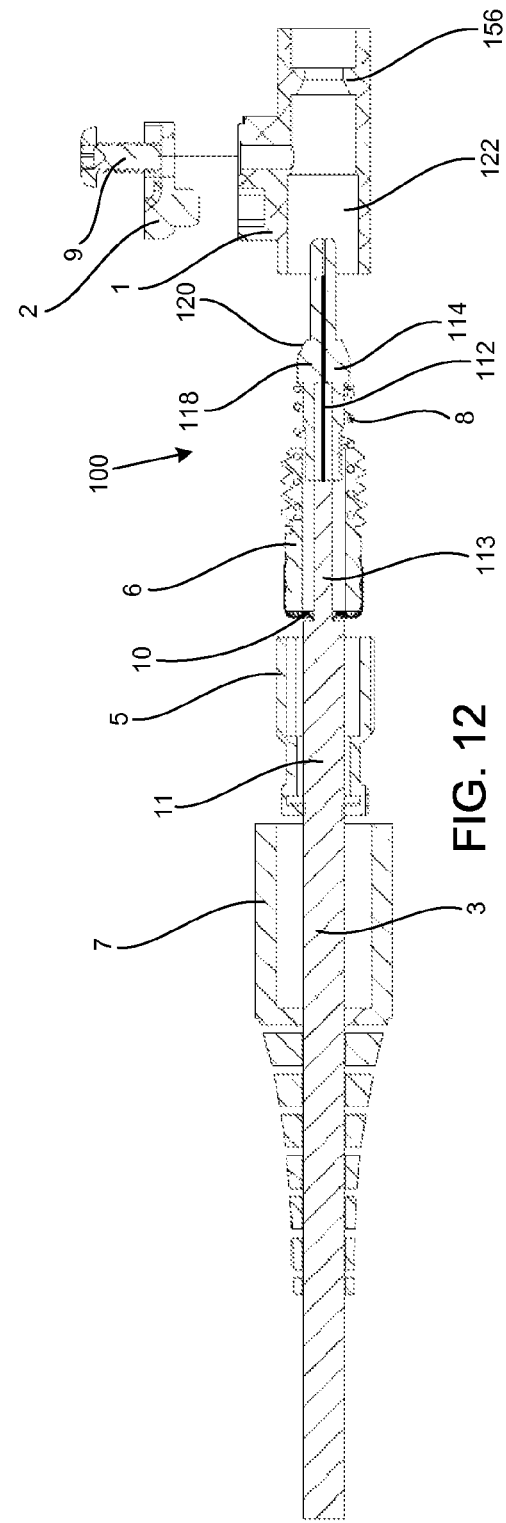

SEPARABLE LOCKING FIBER OPTIC CONNECTOR

RELATED APPLICATION DATA

This application claims the benefit of U.S. Provisional Patent Application No. 61/821,529, dated May 9, 2013, the disclosure of which is herein incorporated by reference in its entirety.

BACKGROUND

Military, commercial avionics, and industrial networking equipment manufacturers are adopting fiber optic components for various communication applications. An exemplary communication application is to create an operative communication link between a control system and a sensor or other data collection device. The use of fiber optic links are often used to replace existing electrical (e.g., "copper") wiring architectures. Fiber optic links provide higher speed, improved electro-magnetic interference (EMI) performance, lower weight, and increased density. Other advantages of fiber optic links include higher data capacity using multiple light propagation modes. In addition, the fiber optic cable itself is protocol agnostic. Therefore, system upgrades often may be made without replacing the fiber optic cable.

Most fiber optic products are designed for the telecommunications market. But these products are generally not rugged enough to withstand the environmental factors that would adversely affect fiber optic systems in harsh operating environments where excessive vibration, shock, and debris may be present.

A vulnerable point in the fiber optic system is the interface between the fiber optic cable and an active device (e.g., an optical transceiver, an optical transmitter, an optical receiver, or a sensor that interfaces directly with the fiber optic cable). To improve this interface, fiber optic pigtails are commonly used. Pigtailing is generally accomplished by using adhesive to permanently affix the terminal end of the fiber optic cable (or connector therefor) to the active device. Conventional pigtailing raises manufacturing and servicing issues. For instance, after a conventional pigtail is put into place, if something goes wrong with the fiber optic cable, the active device, or electronics interconnected with the active device, then the entire system must be replaced since pigtails relying on adhesive cannot be effectively disconnected.

SUMMARY

To improve the interface between a fiber optic cable and an active device in a fiber optic system, disclosed is a connector that improves on industry standard pluggable interfaces. The result is a rugged connector used to establish a separable interface between a fiber optic cable and a housing for an optical component.

In one embodiment, the disclosed locking connector is compatible with an "LC" receptacle (LC being short for little connector or Lucent connector). The disclosed connector includes metal (e.g., aluminum) parts or parts made of another material(s) that are suitable for the environment. The parts form a multi-piece assembly that is interoperable with the existing mechanical features of an LC receptacle that is ordinarily used to interface with a conventional pluggable LC connector. A conventional pluggable LC connector includes a resilient latch that engages a retaining notch in the LC receptacle. The disclosed locking connector and the LC receptacle establish an operative interface between a fiber optic cable and an optical component that is retained by a housing of the receptacle.

The separable nature of the disclosed connector allows for serviceability of the fiber optic cable and/or the active device (or associated electronics) during manufacturing and testing, as well as in the field.

BRIEF DESCRIPTION OF THE DRAWINGS

FIGS. 9, 10 and 11 are respectively of an exploded perspective view, an exploded side view, and an exploded top view of the connector of FIGS. 5-7.

FIG. 12 is a cross-section of the connector taken along the line 12-12 in FIG. 11.

DETAILED DESCRIPTION

A. Definitions

Figure 1:
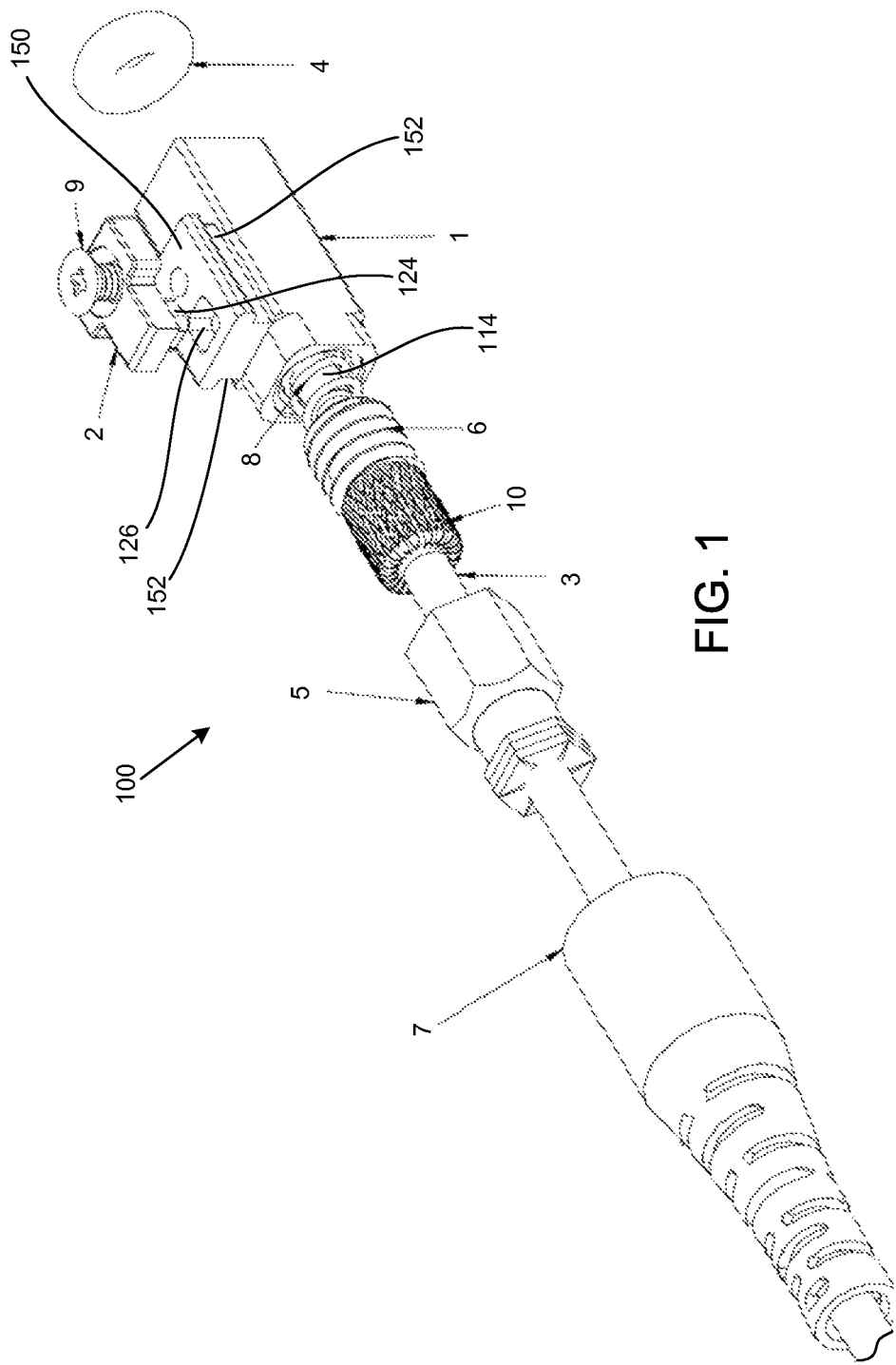
FIG. 1 is an exploded perspective view of a representative embodiment of a locking fiber optic connector.

As used herein, the term "fiber optic cable" refers to a cable that includes a jacketed filament. The filament is typically made of plastic or glass, and light propagates in the filament from one end to the other end, typically for the purpose of data communications.

As used herein, the term "optical transmitter" refers to an active device that converts electrical signals to optical signals, typically with a laser or light emitting diode (LED).

As used herein, the term "optical receiver" refers to an active device that converts optical input signals to electrical output signals.

As used herein, the term "fiber optic transceiver" refers to an active device that functions as both an optical transmitter and an optical receiver.

As used herein, the term "pluggable" refers to a removable interface that does not involve the use of tools (other than a user's hands) for insertion and/or extraction. Typically, a pluggable interface involves a male component that is inserted, at least in part, into a female component.

As used herein, the term "separable" refers to a removable interface that involves the use of one or more tools for insertion and/or extraction. Typically, a separable interface involves a male component that is inserted, at least in part, into a female component.

As used herein, the term "pigtail" refers to a securing of a passive fiber optic cable to an active optical component (e.g., an optical transmitter or an optical receiver).

B. Separable Locking Fiber Optic Connector

Referring to FIGS. 1 through 4, a representative embodiment of a separable locking fiber optic connector 100 is illustrated. The figures are not necessarily to scale. Features that are described and/or illustrated with respect to one embodiment may be used in the same way or in a similar way in one or more other embodiments and/or in combination with or instead of the features of the other embodiments.

The fiber optic connector 100 includes one or more of the following components: a connector body 1 (also referred to herein as a housing), a tongue 2 (also referred to as a locking member), an O-ring 4 (also referred to as a sealing member), a crimp ring 5 (also referred to as a crimp sleeve), a knurled end piece 6 (also referred to as a fitting), a strain relief boot 7, a spring 8, and a securing member 9 (e.g., a fastener that is represented by a screw in the illustrated embodiments).

It will be understood to those of ordinary skill in the art that some artisans use the term "connector" for the terminal end connecting assembly of a fiber optic cable and other artisans use the term "terminus" for the same or similar connecting assembly. This largely depends on the application (e.g., artisans in telecommunications typically use the term connector and artisans in the military and avionics fields typically use the term terminus). For purposes of this document, the term connector and terminus have the same meaning. The fiber optic connector 100 is a terminal end connecting assembly for a fiber optic cable and is, therefore, considered a terminus (also referred to as a connector).

The housing 1 is sized and shaped to coordinate with and fit into the geometry of an LC receptacle 102. Hence, the connector 100 may be considered a male component of a separable interface and the receptacle 102 may be considered a female component of the separable interface.

Figure 2:
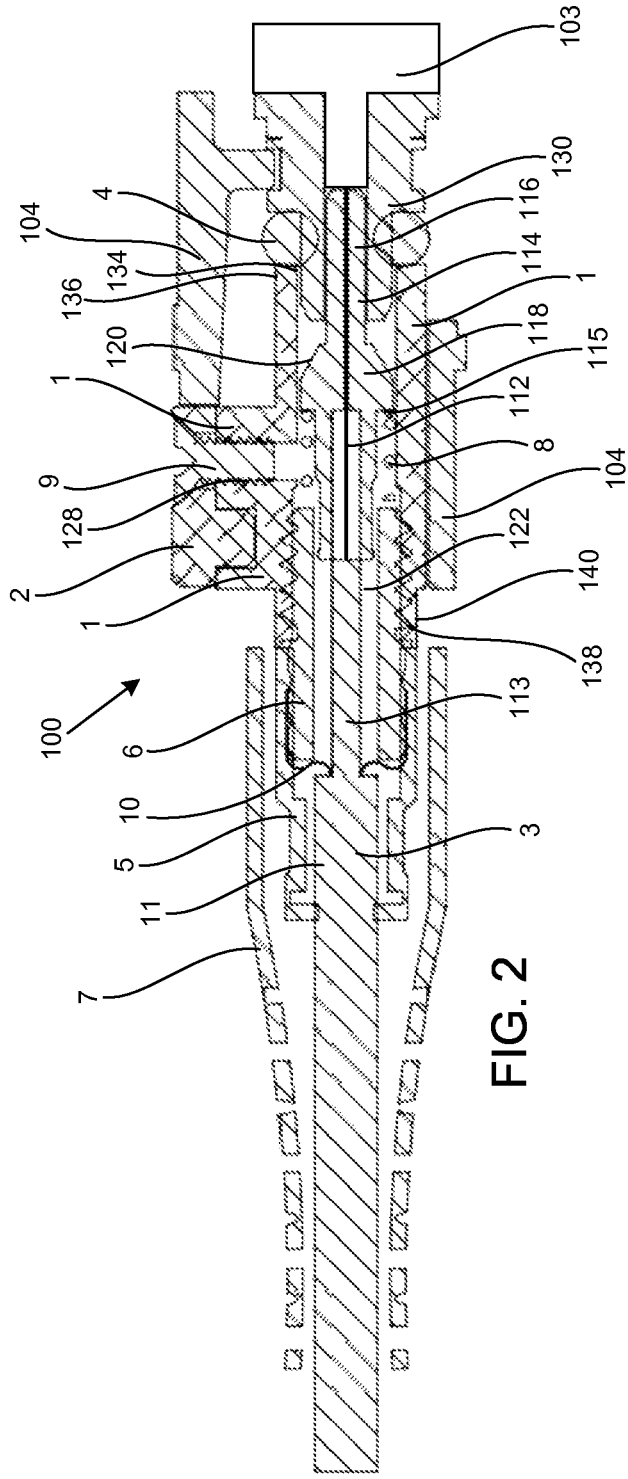
FIG. 2 is a cross-section of the connector taken along a longitudinal axis thereof.

The receptacle 102 is defined by a housing 104 for an optical component 103 (shown schematically in FIG. 2). A fiber optic cable 3 held by the connector 100 interfaces with the optical component 103. The optical component 103 may be an active device as described above or a passive optical element (e.g., another fiber optic cable or an optical coupler). The housing 1 is radially stable in the receptacle 102 so as to have little or no movement relative to the receptacle 102 in directions transverse (e.g., orthogonal to) a longitudinal axis of the housing 1 (e.g., the connector body has little or no movement relative to the receptacle 102 in the lateral and vertical directions relative to the receptacle 103). The housing 1 is also rotationally stable in the receptacle 102 so as to have little or no rotational movement relative to the receptacle 102. "Little" movement refers to movement that is less that an amount that would cause disruption to the operation of the optical system, even during extreme mechanical stresses such as vibrations and shocks experienced in manufacturing systems, military or commercial aircraft (planes and helicopters), watercraft or land vehicles, or similar environments.

The locking member 2 provides axial (e.g., along the longitudinal axis of the housing 1) stability to the connector 100 so that the connector has no or little rearward movement relative to the receptacle 102. At a minimum, a portion 106 of the locking member 2 that fits in a latch area chamber 108 contacts a rearward shoulder wall 110 of the chamber 108. In some cases, depending on the relative sizing of the portion 106 and the chamber 108, the locking member 2 further provides axial stability to the connector 100 so that the connector has no or little forward movement relative to the receptacle 102.

The sealing member 4 is an environmental sealing member that seals an optical path between the fiber optic cable 3 and the optical component 103 located in the housing 104. The sealing member 4 minimizes the chance that contamination (e.g., dust, moisture, oil, hydraulic fluid, etc.) enters the optical path and disrupts operation of the optical system.

The crimp sleeve 5 provides a crimp area for fiber optic strength members 10 (if part of the fiber optic cable 3) and a land for the strain relief boot 7. The strength members 10 may be, for example, KEVLAR fibers that surround a fiber optic filament 112 (FIG. 2) of the fiber optic cable 3. In a typical arrangement for the fiber optic cable 3, the fiber optic cable 3 includes the fiber optic filament 112, which includes a core and cladding and has been coated with one or more coating layers 113. In the illustrated embodiments, the coating 113 is partially stripped from the fiber optic filament 112. In the typical arrangement for the fiber optic cable 3, the fiber optic cable 3 also includes the strength members 10 that surround the coated fiber optic filament 112 and one or more jacketing layers (also referred to as a jacket 11) that, in turn, surround the strength members 10.

The fitting 6 has a forward end surface that functions as a mechanical stop for the spring 8 to facilitate generation of a spring force against the fiber optic filament 112. The fitting 6 also provides a surface against which the crimp sleeve 5 is crimped. The strength members 10, if present, may be bound between the fitting 6 and the crimp sleeve 5.

The strain relief boot 7 serves a typical function in fiber optic assemblies, including providing strain relief and a minimum bending radius for the fiber optic cable 3.

The spring 8 urges a ferrule 114 in a forward direction. The forward direction refers to a direction along the longitudinal axis of the fiber optic cable 3 and toward the optical component 103. The ferrule 114 is connected to the filament 112 and/or the coating 113 (e.g., with adhesive). Therefore, the action of the spring 108 urges the leading end of the filament 112 forward to make operative contact with the optical component 103 that is in the housing 104. The spring 8 provides the proper force for reliable operable connection of these components. The spring 8 acts against a rearward surface 115 of the ferrule 114. In one embodiment, the ferrule 114 is of unitary construction having a sleeve portion 116 that surrounds the filament 112 and extends out of the housing 1 and a ring portion 118 that forms the rearward surface 115. In another embodiment, the ring portion 118 is a separate component from the sleeve portion 116. In either case, the ferrule 114 may also be referred to as a ferrule and stop ring assembly.

The securing member 9 secures the locking member 2 to the housing 1 and allows for the separable interface between the connector 100 and the receptacle 102. Each of the securing member 9 (the screw in the illustrated embodiment), the locking member 2 and the housing 1 are separate components that are assembled to establish the interface between the connector 100 and the receptacle 102. In another embodiment, the securing member 9 is a captive screw that is joined with the locking member 2. Other exemplary securing members 9 include, but are not limited to a rivet, a member that is interference press fit into the housing 1, a swaged element(s), adhesive, etc. In one embodiment, the locking member 2 includes an alignment and strengthening post 124 that is received by a coordinating receptacle 126 in the housing 1. In the illustrated embodiment, a threaded opening 128 in the housing 1 receives the securing member 9. The threaded opening 128 is shown as a through hole that extends from a surface of the connector body that engages against the locking member 2 to the longitudinal passage 122. In this embodiment, the securing member 9 is short enough to avoid contact and interference with operation of the spring 8. In another embodiment, the opening 128 is a blind opening.

An exemplary assembly process for the connector 100 may include placing the strain relief boot 7, the crimp sleeve 5, the fitting 6, and the spring 8 onto the fiber optic cable 3 before assembly of the remaining connector 100 components. The fiber optic cable 3 is stripped and the ferrule 114 is added to the filament 112. The end of the filament 112 is polished. In a typical embodiment, the optical component 103 in the receptacle 102 has a ferrule 130 (also referred to as a nose of an associated optical sub-assembly). The sealing member 4 is placed over the ferrule 130. The fiber optic cable 3 with the ferrule 114 may then be fed through the longitudinal passage 122 of the housing 1 until the sleeve portion 116 of the ferrule 114 is received in an inner bore of the ferrule 130. The fitting 6, which has a threaded forwarded portion, may be screwed into a threaded portion of the longitudinal passage 122 at a rearward portion of the housing 1.

The housing 1 may then be placed into the LC receptacle housing 104. The spring 8 becomes compressed by this action. The locking member 2 is inserted into the retaining notch 132 of the housing 104. The locking member 2 is then secured to the housing 1 using the securing member 9 (e.g., threading the securing member 9 into the opening 128). The strength members 10 are placed on the portion of the fitting 6 that now extends from the housing 1 and the crimp sleeve 5 is crimped to the fitting 6, trapping the strength members 10 between the crimp sleeve 5 and the fitting 6. The strain relief boot 7 may be slid into place over the crimp sleeve 5.

A result of the assembly is to establish a separable, mechanical pigtail connection between the connector 100 and the receptacle 102. The optical and mechanical interface between the terminus (connector 100) and the receptacle 102 is ruggedized, but based on industry standard components (e.g., the LC receptacle). In addition, the assembly process will be understandable to those trained in coupling optical fibers. Although described in the context of an LC receptacle, aspects of the disclosed connector 100 may be employed in other contexts such as, but not limited to MT connectors, SC connectors, FC connectors, or ST connectors. Also, aspects of the disclosed connector 100 may be extended to duplex connectors or higher-order connectors.

Additional aspects and details of the connector 100 will now be described. The fiber optic connector 100 includes the housing 1 having the longitudinal passage 122 extending between a first opening 134 at a first end 136 of the housing and a second opening 138 at a second end 140 of the housing. The housing is sized to fit within a fiber optic receptacle 102 that, in one embodiment, is an industry standard fiber optic receptacle 102. The locking member 2 is a separate part from the housing 1. The locking member 2 is sized to fit within a retaining notch 132 in the fiber optic receptacle 102. The locking member 2, when secured to the housing 1, engages with the retaining notch 132 to prevent separation of the housing 1 from the receptacle 102.

As indicated, the fiber optic connector 100 includes the securing member 9. The securing member 9, in one embodiment, is in the form of a fastener that secures the locking member 2 to the housing 1. The securing member 9 may be, for example, a threaded fastener that engages a coordinating threaded opening 128 in the housing 1. In other embodiment, the locking member 2 includes a securing member 9 that is press fit into a coordinating receiving opening in the housing 1 to secure the locking member 2 to the housing 1.

In some embodiments, the locking member 2 includes a post (e.g., the alignment and strengthening post 124) that fits within a coordinating opening 126 of the housing 1. The post 124 may be in addition to the securing member 9 that secures the locking member 2 to the housing 1. The locking member 2 may include a recess 148 (e.g., a countersink) to accommodate a head of the securing member 9 so that an upper surface of the securing member 9 does not radially extend substantially beyond an upper surface of the locking member 2.

In some embodiment, such as but not limited to when the receptacle 102 is an LC receptacle, the retaining notch 132 is "T" shaped. The "T" shaped retaining notch 132 includes a leg 142 and a rectangular head chamber 108 that is wider than the leg 142. The leg 142 spaces the head chamber 108 apart from an opening 144 of the receptacle 102 into which the housing 1 fits. A rearward boundary wall 110 of the head chamber 108 proximal the opening 144 of the receptacle 102 may be considered a shoulder against which the locking member 2 engages. For instance, the locking member 2 is sized to fit in the head chamber 108 and engage against the shoulder 110. In one embodiment, the locking member 2 need not have a portion that fits in the leg 142. In other embodiment, the locking member 2 includes a first portion that fits in the head chamber 108 and engages against the shoulder 110 and a second portion that fits within the leg 142. It will be recognized that the shoulder 110 functions as a mechanical stop for the locking member 2 to prevent rearward movement of the locking member 2 relative to the receptacle 102. Since the locking member 2 is secured to the housing 1, the shoulder 110 may be further considered a mechanical stop for the fiber optic connector 100 as a whole to prevent rearward movement of the fiber optic connector 100 relative to the receptacle 102.

The housing 1 has a cross-sectional size and shape that coordinates with the receptacle 102. For instance, in the illustrated embodiment, the housing is generally rectangular in cross-section and, on one side thereof, includes a mesa 150. In this embodiment, the locking member 2 engages against the mesa 150 when secured to the housing 1. Also, the mesa 150 may define slots 152 that coordinate with alignment guides 154 of the receptacle 102. In one embodiment, the guides 154 loosely fit in the slots 152 and optical alignment of the fiber optic filament 112 in the receptacle 102 is achieved with the ferrule 114.

As indicated, the fiber optic connector 100 may include the ferrule and stop ring assembly 114 that secures to a fiber optic filament 112 of a fiber optic cable 3. The ferrule and stop ring assembly 114 is disposed in part in the longitudinal passage 122 and extends out of the housing through the first opening 134 at the first end 136.

The fiber optic connector 100 may include a fitting 6 that is disposed in part in the longitudinal passage 122 and extends out of the housing 122 through the second opening 138 at the second end 140. In one embodiment, the fitting 6 is integral with the housing 1. In other embodiment, the fitting 6 is secured to the housing 1. For example, a forward part of the fitting may be threaded and engages threads of the longitudinal passage 122 at the second end 140 to establish the securing of the fitting 6 with the housing 1. In another embodiment, the fitting 6 is press fit or secured with adhesive to the housing 1.

The fiber optic connector 100 may further have a crimp sleeve 5. In one embodiment, strength members 10 of a jacket 11 of the fiber optic cable 3 are bound between a portion of the fitting 6 that extends out of the housing 1 and the crimp sleeve 5. In one embodiment, the portion of the fitting 6 that extends out of the housing 1 has a surface texture. For instance the portion of the fitting 6 that extends out of the housing 1 is knurled.

The fiber optic connector 100 further comprises a spring 8 interposed between the forward end of the fitting 6 and the stop ring portion 118 of the ferrule 114. In this arrangement, the spring 8 urges the leading end of the fiber optic filament 112 in a forward direction, which is a direction along the longitudinal axis of the housing 1 from the second end 140 to the first end 134 and toward the optical component 103. The spring 8 may directly contact at least one of a forward surface of the fitting 6 or a rearward surface 115 of the stop ring 118. In one embodiment, the housing 1 does not limit forward travel of the ferrule and stop ring 114. In other embodiments, as discussed in greater detail below, the housing 1 has an internal shoulder or other structure that limits forward travel of the ferrule and stop ring 114.

In one embodiment, the locking member 2 is not deformable under ordinary conditions, including high levels of shock and vibration resulting from use in military or industrial environments. For instance, the locking member 2 is non-resilient (e.g., is not capable of freely returning to a previous position or shape in the manner that a plastic deformable latch is for a conventional LC connector). In one embodiment, the locking member 2 and/or the housing 1 are made from metal, such as aluminum, stainless steel, or any other suitable metal. In other embodiments, the locking member 2 and/or the housing 1 are made from high density plastic.

In one embodiment, the connector 100 is separable from the receptacle 102 by un-securing the locking member 2 from the housing 1 and sliding the housing 1 from the receptacle 102. In this manner, interface of the connector 100 with the receptacle 102 (and fiber optic cable 3 with optical component 103) is not permanent as is typical if conventional pigtailing with adhesive were used between a conventional LC connector and a conventional LC receptacle.

Also, prevention of separation of the housing 1 from the receptacle 102 is accomplished without adhesive. But it is possible that the fiber optic connector 100 includes thread locking adhesive at one or more threaded interfaces within the fiber optic connector 100 (e.g., between the housing 1 and fitting 6). It is also possible that the fiber optic connector 100 includes adhesive in other locations (e.g., between the ferrule 114 and filament 112), but not as a means of securing the fiber optic connector 100 with the receptacle 102.

Prevention of separation of the housing 1 from the receptacle 102 is accomplished without a resilient latch member. For example, the housing 1 does not include a resilient latch member secured thereto or integral therewith that interacts with the receptacle 102.

In one embodiment, the fiber optic connector 100 includes a sealing member 4 that forms an environmental seal between the first end 136 of the housing 1 and a structural element in the receptacle 102. In one embodiment, the structural element is a ferrule 130 for an optical component 103. The optical component 103 may be, for example, an active optical sub-assembly (e.g., a transmitting optical sub-assembly (TOSA) or a receiving optical sub-assembly (ROSA)) or a passive optical component (e.g., another fiber optical cable).

In some cases, the fiber optic connector 100 is sold as a kit that is field-assembled at a terminal end of an optical cable. In other cases, a fiber optic cable and connector assembly is factory assembled and includes a fiber optic cable and the fiber optic connector 100 as a terminus for the fiber optic cable. In the case of this type of fiber optic cable and connector assembly, as discussed in greater detail below, the housing 1 may include a shoulder in the longitudinal passage 122 at or near the first end 136, and a forward surface 120 of the stop ring 118 engages the shoulder to pretension the spring 8 prior to engagement of the housing 1 with the receptacle 102.

It will be appreciated that a duplex connector will include a housing 1 that has two longitudinal passages 122 for respective fiber optic cables 3 and at least one locking member 3 and at least one securing member 9.

With additional reference to FIGS. 5 through 12, some additional features of the fiber optic connector 100 will be described. Features that are the same as or similar to features already described will not be described again. Also, the reference numbers used in FIGS. 1 through 4 will be used in subsequent figures to refer to similar items.

Figure 8:
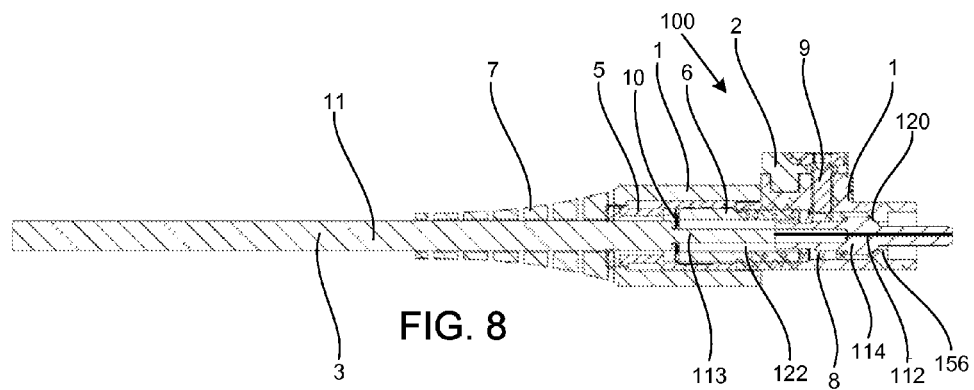
FIG. 8 is a cross-section of the connector taken along the line 8-8 in FIG. 7.

As best shown in cross-sectional FIGS. 8 and 12, a forward surface 120 of the ring portion 118 of the ferrule 114 may engage an internal shoulder 156 that is formed in the longitudinal passage 122 of the housing 1. The internal shoulder 156 is positioned to limit forward movement of the ferrule 114 and leading end of the filament 112. The shoulder 156 may be present in embodiments where the connector 100 is assembled to the fiber optic cable 3 (e.g., in a factory) before any mating with a receptacle to allow for pretensioning of the spring 8. When the connector 100 is assembled to the fiber optic cable 3 during mating of the connector 100 with the receptacle 102 (e.g., in a factory or in the field), then the shoulder 156 also may be present. In cases when the shoulder is not present, components in the receptacle 102 may serve as a forward stop for the ferrule 114 during assembly.

In the illustrated embodiment, the ferrule 114 and shoulder 156 have coordinating shapes to align the filament 112 in a desired location relative to the housing 1. In this manner, the filament 112 and sleeve portion 116 may be pre-positioned radially and longitudinally relative to the ferrule 130 and optical component 103 as the housing 1 is inserted into the receptacle 102 to improve establishment of an operative interface between the filament 112 and the optical component 103. In the illustrated embodiment, the forward surface 120 and the shoulder 156 form coordinated frustrated cones such that the forward surface 120 becomes seated in the shoulder 156 under the forward urging of the spring 8.

As indicated, each of the securing member 9 (the screw in the illustrated embodiment), the locking member 2 and the housing 1 are separate components that are assembled to establish the interface between the connector 100 and the receptacle 102. In one embodiment, two or more components of the connector 100 are tethered to one another to minimize introduction of foreign object debris (FOD) in a system that includes the receptacle 102 in case an installer mishandles one of the components during installation.

As shown in FIG. 10, for example, the connector 100 may include a tether 158 that limits freedom of movement of the fastener 9 away from the fiber optic cable 3 or components connected to the fiber optic cable 3. The tether 158 may be made from braided or stranded wire, natural or synthetic fibers, a plastic ribbon, or other appropriate material that is flexible enough to allow manipulation of components of the connector 100 relative to one another during installation or assembly. In the illustrated embodiment, the tether 58 includes a first loop 160 at a first end of the tether 58 and a second loop 162 at a second end of the tether 158. The first loop 160 captures the fastener 9. In the illustrated embodiment, the first loop 160 surrounds a threaded portion of the fastener 9 and is sized so that the threads resist pulling of the fastener 9 free from the tether 158. But rotational movement of the fastener 9 is not constrained so as to allow for securing of the fastener 9 and locking member 2 to the housing 1. Similarly, the second loop 162 surrounds a portion of the strain relief boot 7 and is sized so that geometry of the strain relief boot 7 captures the loop 162. In another embodiment, the second loop 162 of the tether 158 may surround an appropriate portion of the crimp sleeve 5 or the fitting 6. Other ways of tethering the components are possible, such as by feeding the tether 158 through holes in one or more of the components and tying or crimping free ends of the tether 158 so the free ends cannot slide back through the holes. The tether 158 also may be connected to one or more components with adhesive, solder or other securing means.

The tether 158 may further secure one or more other components. For example, as shown in the FIG. 10, the tether 158 may interact with the locking member 2. The tether 158 may be secured to the locking member with adhesive, solder or other securing means at a location along the length of the tether 158 between the loops 160, 162. In another embodiment, the tether 158 may be feed through a ring attached to the locking member 2 or through an opening that passes through the locking member 2. In one embodiment, the tether also or alternatively interacts with the housing 1 using a securing means or by passing through an opening in the housing 1.

Figure 7:
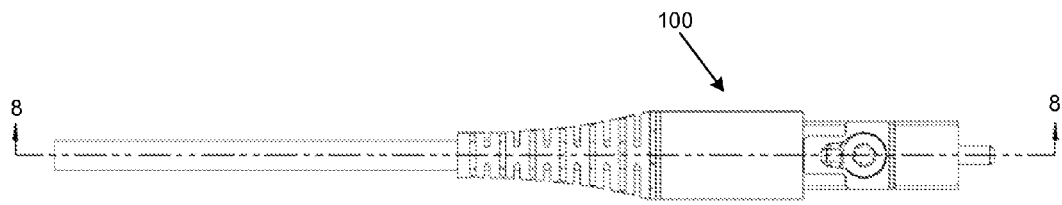

As shown in FIGS. 7 through 9, the recess 148 in the locking member 2 may be sized to accommodate the tether 158 when the fastener 9 is installed into the locking member 2 and housing 1. In embodiments where the second end of the tether surrounds or is connected to one of the crimp sleeve 5 or the fitting 6, the strain relief boot 7 may include a groove or other feature to accommodate the tether 158 when the strain relief boot 7 is placed over the crimp sleeve 5.

In another embodiment, the fastener 9 may be a captive screw that does not easily separate from the locking member 2, and the locking member 2 is tethered to a component disposed on the fiber optic cable 3 (e.g., the strain relief boot 7, the crimp sleeve 5 or the fitting 6).

In one embodiment, after the connector 100 is mated to the receptacle 102 and secured, at least a portion of the tether 158 may be removed by cutting the tether 158. Even when two or more components are tethered, each of the components are still considered separate components.

With reference to FIG. 10, a fiber optic sub-assembly 164 includes the fiber optic cable 3 and the ferrule and stop ring assembly 114, spring 8, fitting 5, crimp sleeve 5 and strain relief boot 7 assembled onto the fiber optic cable 3 as described above. The fiber optic sub-assembly 164 may be used with the housing 1, fastener 9, locking member 2 and receptacle 102 as described above. In another embodiment, the opening 144 of the receptacle 102 is threaded to threadably mate with the threaded portion of the fitting 5. In this embodiment, the fiber optic sub-assembly 164 is secured to the receptacle by threading the fitting 6 into the receptacle 102. Thus, the fiber optic sub-assembly is retained to the receptacle without the use of the housing 1, fastener 9, and locking member 2. However, the receptacle 102 in this embodiment is not an industry standard receptacle (e.g., the illustrated LC receptacle).

Figure 13:
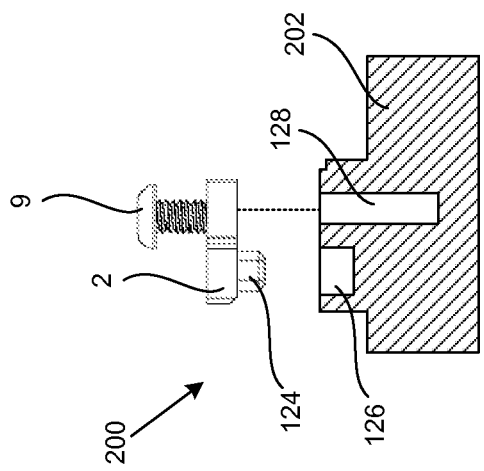
FIG. 13 is an exploded view of a receptacle plug.
Figure 3:
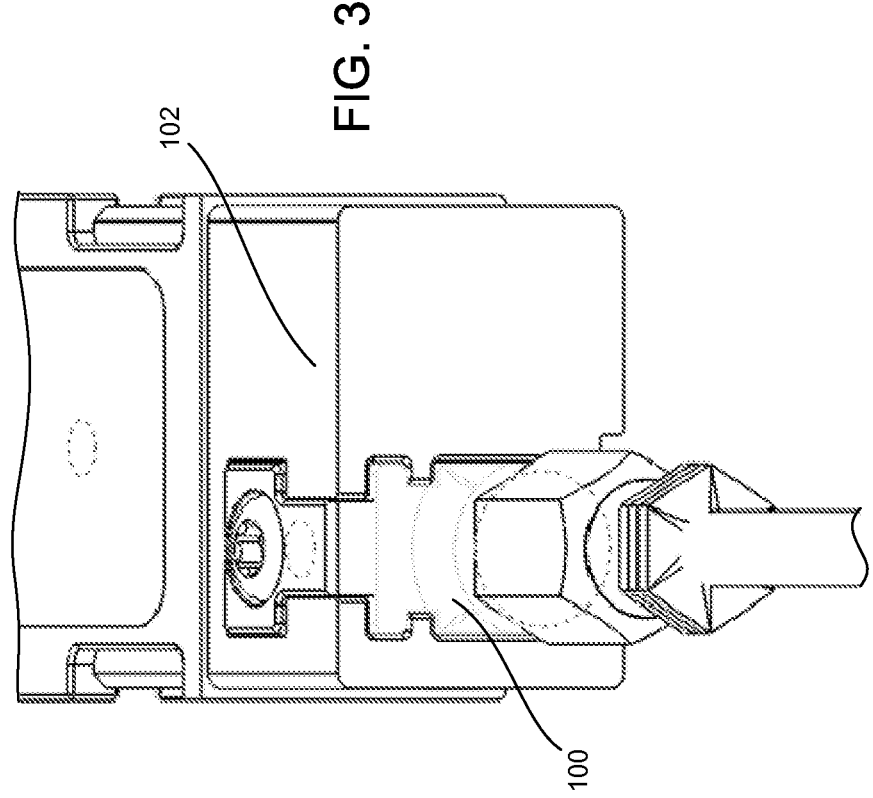
FIG. 3 is a forward-facing perspective view of the connector assembled with a coordinating receptacle.
Figure 4:
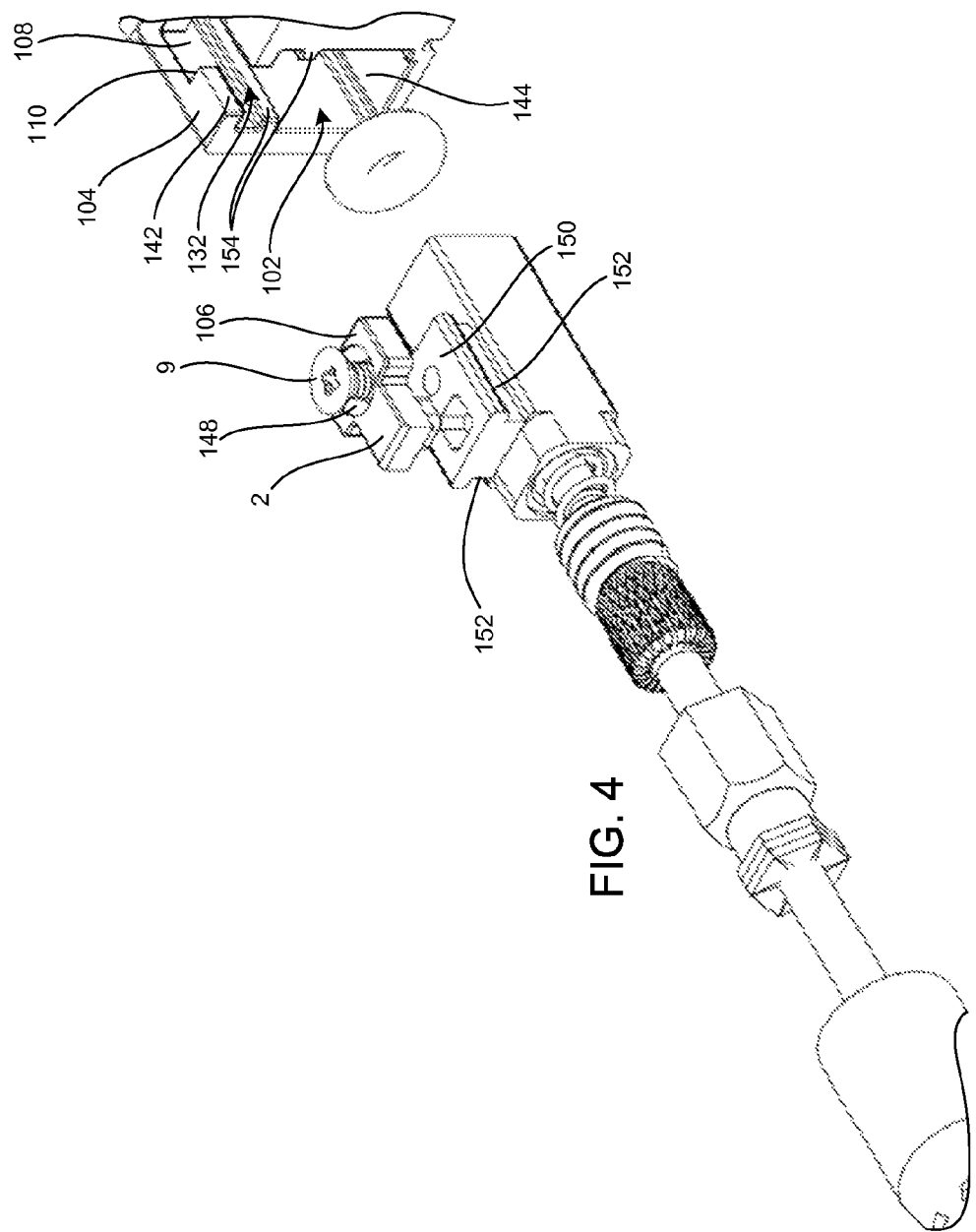
FIG. 4 is another exploded perspective view of the connector adjacent the receptacle.
Figure 6:
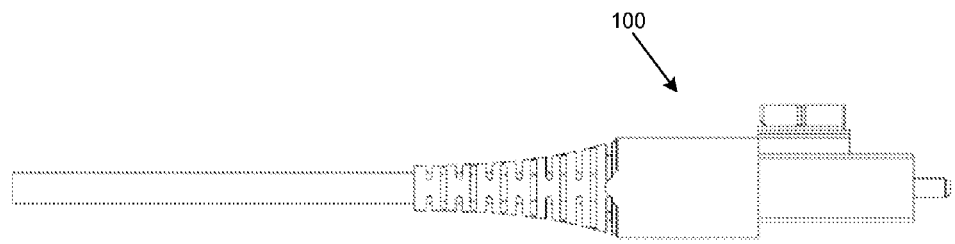
FIGS. 5, 6 and 7 are respectively a perspective view, a side view, and a top view of another representative embodiment of a locking fiber optic connector.
Figure 5:
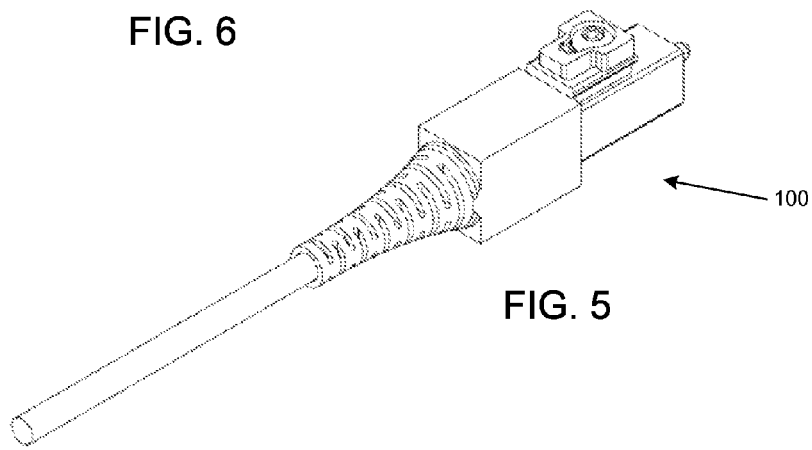

Referring now to FIG. 13, a plug assembly 200 is illustrated. The plug assembly 200 may be used to seal off or cover an unused receptacle 102. The plug assembly 200 may be configured to seal the receptacle 102 from foreign object contamination (e.g., dust, moisture, etc.). The plug assembly 200 may be configured to close an electromagnetic interference aperture of the receptacle 102.

The plug assembly 200 includes a housing 202 (shown in cross-section), which is configured in similar manner to the housing 1, but does not include the longitudinal passage 122. Rather, the housing 202 is solid, except for an opening 128 to accept the fastener 9 and an opening 126 to accept the post 124 of the locking member 2. The plug assembly 200 may be assembled with the receptacle 102 by inserting the housing 202 into the receptacle housing 104. Then, the locking member 2 is inserted into the retaining notch 132 of the housing 104. The locking member 2 is then secured to the housing 202 using the securing member 9 (e.g., threading the securing member 9 into the opening 128). In one embodiment, the plug assembly 200 includes a sealing member (e.g., a gasket) disposed on or molded to the housing 202 to reduced contaminant entry into the housing 104.

Additional aspects of the disclosure will be understood from the appended claims, which form part of this specification.

The invention claimed is:

1. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the housing is generally rectangular in cross-section and, on one side thereof, comprises a mesa, the locking member engages against the mesa when secured to the housing.

2. The fiber optic connector of claim 1, wherein the mesa defines slots that coordinate with alignment guides of the receptacle.

3. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the fiber optic connector further comprises a ferrule and stop ring assembly that secures to a fiber optic filament of a fiber optic cable, the ferrule and stop ring assembly disposed in part in the longitudinal passage and extending out of the housing through the first opening at the first end; and
wherein the fiber optic connector further comprises a fitting that is disposed in part in the longitudinal passage and extending out of the housing through the second opening at the second end; and
wherein the fitting is removably secured to the housing.

4. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the fiber optic connector further comprises a ferrule and stop ring assembly that secures to a fiber optic filament of a fiber optic cable, the ferrule and stop ring assembly disposed in part in the longitudinal passage and extending out of the housing through the first opening at the first end; and wherein the housing does not limit forward travel of the ferrule and stop ring assembly.

5. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the connector is separable from the receptacle by un-securing the locking member from the housing and sliding the housing from the receptacle.

6. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the retaining notch is "T" shaped, including a leg and a rectangular head chamber that is wider than the leg, the leg spacing the head chamber apart from an opening of the receptacle into which the housing fits, a boundary wall of the head chamber proximal the opening of the receptacle being a shoulder; and
wherein the locking member sized to fit in the head chamber and engage against the shoulder.

7. The fiber optic connector of claim 6, wherein the locking member does not have a portion that fits in the leg.

8. The fiber optic connector of claim 6, wherein the locking member further includes a portion to fit within the leg.

9. The fiber optic connector of claim 8, wherein the fiber optic connector further including a fastener to secure the locking member to the housing, the fastener extends through an opening in the portion that fits in the head chamber.

10. The fiber optic connector of claim 9, wherein the locking member comprises a post that fits within a coordinating opening of the housing, the post extending from the portion that fits in the leg.

11. A fiber optic connector, comprising:
a housing having a longitudinal passage extending between a first opening at a first end of the housing and a second opening at a second end of the housing, the housing sized to fit within a fiber optic receptacle; and
a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
wherein the receptacle is an industry standard LC receptacle.

12. The fiber optic connector of claim 11, wherein the locking member comprises a securing member that is fit into a coordinating receiving opening in the housing to secure the locking member to the housing.

13. The fiber optic connector of claim 11, wherein the fiber optic connector further comprises a ferrule and stop ring assembly that secures to a fiber optic filament of a fiber optic cable, the ferrule and stop ring assembly disposed in part in the longitudinal passage and extending out of the housing through the first opening at the first end.

14. The fiber optic connector of claim 13, wherein the housing includes a shoulder in the longitudinal passage, the shoulder limiting forward travel of the ferrule and stop ring assembly.

15. The fiber optic connector of claim 13, wherein the fiber optic connector further comprises a fitting that is disposed in part in the longitudinal passage and extending out of the housing through the second opening at the second end.

16. The fiber optic connector of claim 15, wherein the fiber optic connector further comprises a crimp sleeve, and strength members of a jacket of a fiber optic cable are bound between a portion of the fitting that extends out of the housing and the crimp sleeve.

17. The fiber optic connector of claim 15, wherein the fiber optic connector further comprises a spring interposed between the fitting and the stop ring to urge an end of the fiber optic filament in a forward direction, the forward direction being a direction along the longitudinal passage from the second end to the first end.

18. The fiber optic connector of claim 17, wherein the spring directly contacts at least one of a forward surface of the fitting or a rearward surface of the stop ring.

19. The fiber optic connector of claim 17, wherein the housing includes a shoulder in the longitudinal passage, the shoulder limiting forward travel of the ferrule and stop ring assembly.

20. The fiber optic connector of claim 19, wherein the shoulder and ferrule and stop ring interact to align the fiber optic filament relative to the longitudinal passage.

21. The fiber optic connector of claim 11, wherein the fiber optic connector further comprises a securing member in the form of a fastener, the fastener securing the locking member to the housing.

22. The fiber optic connector of claim 21, wherein the fastener is a threaded fastener that engages a coordinating threaded opening in the housing.

23. The fiber optic connector of claim 11, wherein the locking member is non-resilient.

24. The fiber optic connector of claim 11, wherein the locking member comprises a post that fits within a coordinating opening of the housing, and the fiber optic connector further comprises a securing member in the form of a fastener, the fastener securing the locking member to the housing.

25. The fiber optic connector of claim 11, wherein prevention of separation of the housing from the receptacle is accomplished without adhesive.

26. The fiber optic connector of claim 11, further comprising a tether that connects a fiber optic cable sub-assembly with at least one of the locking member or a fastener that fastens the locking member to the housing.

27. A fiber optic assembly, comprising the fiber optic connector of claim 11 and a fiber optic cable, the fiber optic connector attached to the fiber optic cable as a terminus therefor.

28. The fiber optic assembly of claim 27, wherein the housing includes a shoulder in the longitudinal passage at the first end, and the fiber optic connector comprises a ferrule and stop ring assembly secured to a filament of the fiber optic cable and a spring to urge the ferrule and stop ring assembly and filament in a forward direction, a forward surface of the stop ring engaging the shoulder to pretension the spring prior to engagement of the housing with the receptacle.

29. The fiber optic connector of claim 11, wherein the fiber optic connector is a kit that is field-assembled at a terminal end of an optical cable.

30. A fiber optic connector, comprising:
   a housing having a longitudinal passage extending between a first opening at a first end of the housing and a second opening at a second end of the housing, the housing sized to fit within a fiber optic receptacle; and
   a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
   wherein prevention of separation of the housing from the receptacle is accomplished without a resilient latch member and
   the housing does not include a resilient latch member secured thereto or integral therewith that interacts with the receptacle.

31. A fiber optic connector, comprising:
   a housing having a longitudinal passage extending between a first opening at a first end of the housing and a second opening at a second end of the housing, the housing sized to fit within a fiber optic receptacle; and
   a locking member that is a separate part from the housing, the locking member sized to fit within a retaining notch in the fiber optic receptacle, and wherein the locking member, when secured to the housing and located in the retaining notch, interfaces with the retaining notch to prevent separation of the housing from the receptacle; and
   wherein the fiber optic connector further comprises a sealing member that forms an environmental seal between the first end of the housing and a structural element in the receptacle.

32. The fiber optic connector of claim 31, wherein the structural element in the receptacle is a ferrule of an active or passive optical component.

\* \* \* \* \*